Evaporation appliances of the "creep" type described in the French Patent No. 294,692 of November 27, 1899, filed in the name of Paul Kestner are well known and are strongly indicated when it is desired to obtain a highly-concentrated solution with a single pass.

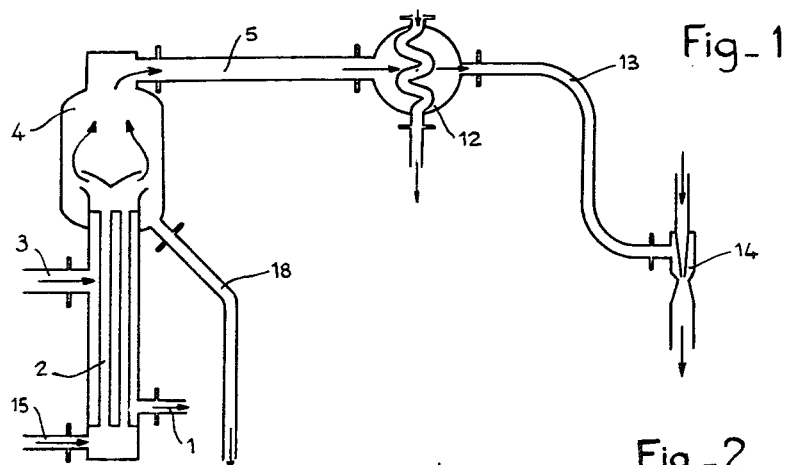
Fig_1
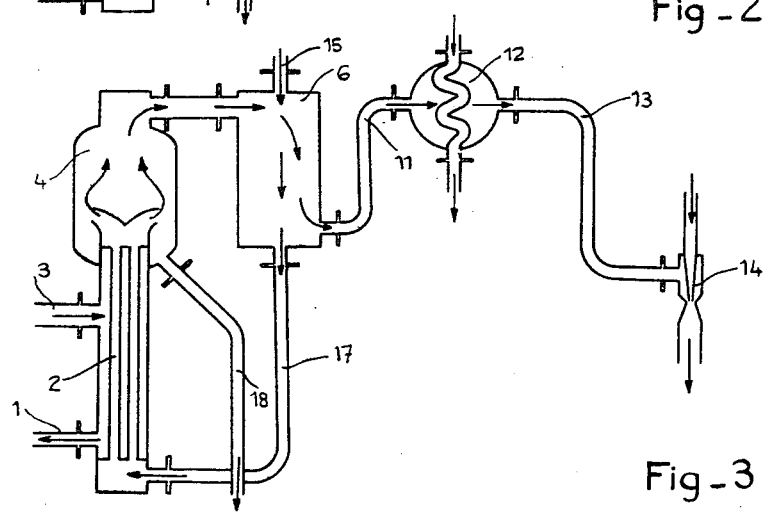
Fig_2
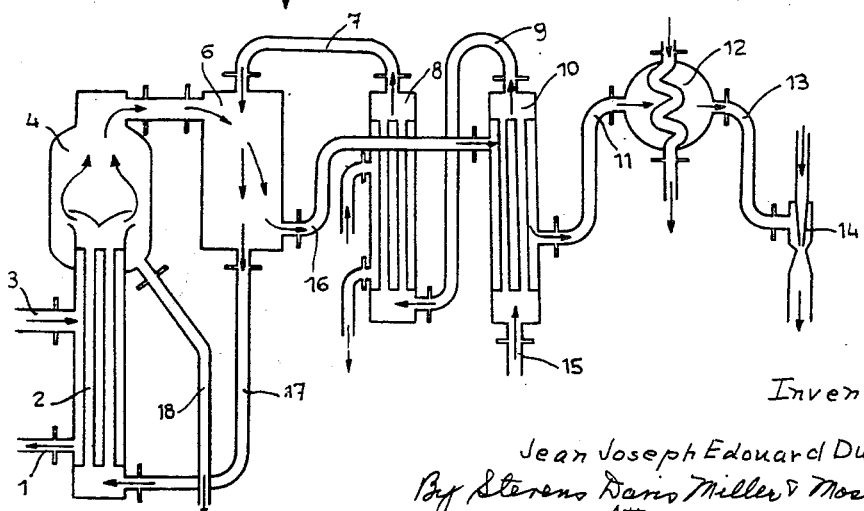
Fig_3
Inventor
Jean Joseph Edouard Duval
By Stevens Davis Miller & Mosher
Attorneys 3,131,110
METHOD OF ACHIEVING HIGH CONCENTRATES OF SOLUTIONS HAVING A HIGH BOILING POINT
Jean Joseph Edouard Duval, Paris, France, assignor to Appareils et Evaporateurs Kestner, Lille, France, a French corporation
Filed July 5, 1960, Ser. No. 40,671
Claims priority, application France July 7, 1959
1 Claim. (Cl. 159—47)

Such appliances consist essentially of an apparatus known as an evaporator which comprises, chiefly, a heat exchanger in which the solution to be concentrated is heated in a vacuum by contact with a bundle of tubes heated by the vapour of a suitable fluid and a separator in which the concentrated solution is separated from the vapour. A vacuum pump is connected to the separator via a condenser in which the vapour is condensed.

A notably successful application of the principle behind this type of apparatus has been the achieving of soda-solution concentrates (NaOH) having 98–99% NaOH contents.

In this case, the concentration is effected under an attenuated vacuum (approximately ½ atmosphere, absolute) and the heating is carried out by means of the vapour of a fluid having a high boiling-point, examples being diphenyl or a eutectic mixture of diphenyl and diphenyl oxide. Under such a vacuum, the solution of caustic soda will boil at a temperature of 350° C., which implies the need to use, for the heating process, a heating fluid of higher temperature such as a eutectic mixture of diphenyl and diphenyl oxide, which boils at a temperature of 390° C. under a pressure of 9 atmospheres.

Now although such an apparatus is most practical insofar as concentration is concerned, it does not operate with a favourable thermal efficiency; for indeed, the steam evaporated from the solutions leaves the separator strongly superheated, being normally at the temperature of the solution which emits it, namely 350° C. under an absolute pressure of ½ atmosphere, which is equivalent to about 270 degrees centigrade of superheating. This superheating heat is needlessly lost in the condenser.

The present invention has for its object a method which enables the heat corresponding to this superheating process to be recuperated. The method consists basically in causing to pass through a common chamber and in placing together in intimate contact the solutions to be concentrated and the superheated vapour from the evaporator.

This chamber is provided with a distribution device designed to achieve intimate contact between the liquid phase and the vapour phase, it being possible for the liquid and the vapour to circulate indifferently in the same direction or in opposite directions (parallel or counterstreamed currents). This intimate contact may be accomplished by any suitable means well known per se, examples being baffle systems, columns with plates like rectifying or fractionating columns, filling bodies such as Raschig's rings, etc.

In the description of the method according to the invention, this chamber in which is effected contact between the vapour and the solutions shall be referred to as the "de-superheater."

The difference between the known method described in French Patent No. 294,692, filed by Paul Kestner, and that forming the object of the invention is clearly apparent in the highly diagrammatic accompanying drawings.

FIG. 1 shows the type of installation used prior to the invention.

FIGS. 2 and 3 illustrate installations for performing the method according to the invention.

In the known type of installation (FIG. 1), the solution to be processed flows through a pipe 15 into an exchanger 2 in which it eliminates part of its water in the form of steam in a bundle of tubes about which circulates the heating vapour which is introduced via a tube 3 and which emerges through a pipe 1. The concentrated solution and the steam given off penetrate into a separator 4 from which they are subsequently evacuated, the former through a tube 18 and the latter through a pipe 5 leading to a condenser 12 in which the steam is condensed.

Via a tube 13, the filter or suction-pump or the vacuum pump 14 maintains the required vacuum throughout the system.

So far as the method according to the invention is concerned, several possible applications may be considered: (1) the de-superheater receives solutions which are at a temperature below their boiling point, under the accepted conditions of pressure.

In this case the steam will surrender its superheat to the solution, and it will be possible for the latter to be heated thus to its boiling point and to sustain, in certain cases, some light evaporation; (2) the de-superheater receives solutions which are at a temperature equal to this boiling point, under the accepted conditions of pressure.

The solutions may be raised to the temperature considered, either in a heater (the principle of which is well known per se) or in an evaporator which effects a pre-concentration designed to reduce the work accomplished by the main evaporator proper which achieves the final dehydration.

In this case the superheat in the evaporated steam will be used to effect some degree of evaporation in the solutions.

By way of example, FIG. 2 illustrates an installation designed to perform the method according to the invention in the first of the two cases referred to hereinbefore.

The evaporator 2, 4 is of the same type as that shown in FIG. 1, and the superheated steam leaves this evaporator and passes through a de-superheater 6 which receives, at its top and through a tube 15, the solution to be processed. The latter is thus heated by contact with the superheated steam before it penetrates into the exchanger 2 of the evaporator via a pipe 17. The concentrated solution leaves the latter through the tube 18, while the steam passes through a pipe 11 of the de-superheater 6 to the condenser 12 where it condenses. The vacuum pump 14 maintains the necessary vacuum throughout the installation.

By way of example, FIG. 3 illustrates an installation designed to perform the method embodying the invention in the second of the cases mentioned hereinbefore, and which enables a better thermal efficiency to be obtained than when using the layout shown in FIG. 2.

As shown in FIG. 3, the installation includes two further component elements: (a) a heater 10 which receives through the tube 15 the solution to be concentrated and which is inserted into the steam evacuation circuit between the de-superheater 6 and the condenser 12, the steam passing from the de-superheater 6 to the heater 10 via a pipe 16, and (b) and evaporator 8 inserted into the circuit of the solution to be concentrated, between the heater 10 referred to above and the de-superheater 6, this evaporator 8 being heated by a suitable fluid which may be identical to or different from the fluid used to heat the bundle 2.

The functioning principle of this installation will now be described in its utilization, say, for the concentration of caustic soda.

The evaporator 2, 4 is of the same type as the one shown in FIGS. 1 and 2, and the superheated steam leaves this evaporator and passes through the de-superheater 6 which receives, at its top, solutions which have already been preconcentrated by a process undergone in the two extra component members referred to hereinbefore. These solutions have first been heated in the heater 10 by the evaporation steam from the de-superheater 6 before this steam is condensed in the condenser 12; they have then passed through the pipe 9 into the evaporator 8 where they have been brought into a state of intermediate concentration (70% NaOH, for example). These solutions thus reach, through a pipe 7, the de-superheater 6 at their boiling temperature, and they meet there the steam superheated to 350° C. emanating from the main evaporator 2, 4. The superheating heat is consequently absorbed and this results in a further evaporation which raises the solutions to about 75% on entry into the evaporator 2, 4.

This example given of the concentration of soda has been provided by way of example only. The same principle is applicable to all other products whose solutions have a high boiling point.

It should be noted that in addition to the good thermal efficiency which it enables, the de-superheater offers the enormous advantage of totally degassing the solutions, which are raised to a temperature close to their boiling point.

Now as is well known, the gases contained, oxygen chiefly, cause increased corrosion of the exchange surfaces of the evaporator if they have not first been extracted from the solutions.

By achieving a slight degree of evaporation of the solutions, the de-superheater ensures perfect degassing of these solutions and prevents any harmful action by the gases on the evaporator which follows it.

I claim:

The method of concentrating a solution comprising the steps of feeding a solution into an indirect contact heater in which it is heated by vapor, passing the preheated solution into an indirectly preheated evaporator in which it is further heated, passing the solution heated in the evaporator into a direct contact preheater in which it contacts superheated vapor, passing the solution heated in the direct contact preheater into an indirectly heated heater evaporator wherein the solution is evaporated and superheated vapor is released which vapor is employed in said direct contact preheater and which superheated vapor after losing its super heat is used to heat the solution in said indirect contact heater, and maintaining said indirect contact heater, indirect preheated evaporator, direct contact preheater and indirectly heater evaporator under partial vacuum.

References Cited in the file of this patent

UNITED STATES PATENTS

| | | |
|---|---|---|
| 1,552,562 | Kirgan | Sept. 8, 1925 |
| 1,883,211 | Wilson | Aug. 18, 1932 |
| 2,406,581 | Bergstrom et al. | Aug. 27, 1946 |
| 2,839,122 | La Guiharre | June 17, 1958 |

FOREIGN PATENTS

| | | |
|---|---|---|
| 709,044 | France | Aug. 1, 1931 |